UNITED STATES PATENT OFFICE.

JOHN A. KOHRSSEN, OF ALLEGHENY, PENNSYLVANIA.

IMPROVEMENT IN COMPOSITIONS FOR PRESERVING ANIMAL AND VEGETABLE MATTER.

Specification forming part of Letters Patent No. 187,644, dated February 20, 1877; application filed September 20, 1876.

*To all whom it may concern:*

Be it known that I, JOHN A. KOHRSSEN, of Allegheny, in the county of Allegheny and State of Pennsylvania, have invented a new and useful Improvement in Compound for Curing Meats and Vegetables; and I do hereby declare that the following is a full and exact description thereof.

My invention relates to an improvement in compound for curing and preserving animal and vegetable matter; and consists of calcined alum, sugar, niter, sal-soda, and salt, compounded and mixed in about the following proportions, to wit: Calcined alum, five (5) pounds; sugar, five (5) pounds; niter, one (1) ounce; salt, one (1) ounce; sal-soda, one (1) ounce; the whole being mixed with twenty (20) gallons of water, forming a solution, which is used in about the same manner as the ordinary pickle is applied to meat or vegetables.

Having thus described my improved compound for curing and preserving meats and vegetables, what I claim is—

A compound for preserving animal and vegetable matter, consisting of calcined alum, sugar, niter, salt, sal-soda, and water, substantially in the proportions herein described.

JOHN A. KOHRSSEN.

Witnesses:
   A. C. JOHNSTON,
   JAMES J. JOHNSTON.